US009800843B2

(12) United States Patent
Lim et al.

(10) Patent No.: US 9,800,843 B2
(45) Date of Patent: Oct. 24, 2017

(54) IMAGE SENSOR FOR REDUCING CHANNEL VARIATION AND IMAGE PROCESSING SYSTEM INCLUDING THE SAME

(71) Applicant: Samsung Electronics Co., Ltd., Suwon-si, Gyeonggi-do (KR)

(72) Inventors: Seung Hyun Lim, Hwaseong-si (KR); Jae Hong Kim, Suwon-si (KR); Han Kook Cho, Suwon-si (KR); Dong Hun Lee, Yongin-si (KR); Jin Uk Jeon, Ansan-si (KR); Seog Heon Ham, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/973,700

(22) Filed: Dec. 17, 2015

(65) Prior Publication Data

US 2016/0182848 A1  Jun. 23, 2016

(30) Foreign Application Priority Data

Dec. 18, 2014  (KR) ........................ 10-2014-0183534

(51) Int. Cl.
*H04N 5/345* (2011.01)
*H04N 5/232* (2006.01)
(Continued)

(52) U.S. Cl.
CPC ........... *H04N 9/045* (2013.01); *H04N 5/3456* (2013.01); *H04N 5/3651* (2013.01); *H04N 5/378* (2013.01)

(58) Field of Classification Search
CPC ............ H01L 27/146; H01L 27/01423; H01L 27/014609; H01L 27/14643; H04N 5/225;
(Continued)

(56) References Cited

U.S. PATENT DOCUMENTS 8,659,691 B2 * 2/2014 Noda ................... H04N 5/3452
348/294
2008/0008465 A1 * 1/2008 Morimoto .............. G03B 13/18
396/89
(Continued)

*Primary Examiner* — Lin Ye
*Assistant Examiner* — Marly Camargo
(74) *Attorney, Agent, or Firm* — Renaissance IP Law Group LLP

(57) ABSTRACT

An image sensor for reducing channel variation and an image processing system including the same. The image sensor includes first to $m^{th}$ pixels ($m \geq 2$), each of which is connected to a corresponding column line from among first to $m^{th}$ column lines and is configured to output a respective pixel signal.' The image sensor further includes first to $m^{th}$ bias circuits, each of which is connected to a corresponding column line from among the first to $m^{th}$ column lines and is configured to fix a voltage of the corresponding column line to a bias voltage when a column line-specific pixel is not selected to output the respective pixel signal. An analog-to-digital converter in the image sensor is configured to convert the pixel signals into digital signals.

20 Claims, 16 Drawing Sheets

(51) Int. Cl.
*H04N 5/335* (2011.01)
*H04N 9/04* (2006.01)
*H04N 5/365* (2011.01)
*H04N 5/378* (2011.01)

(58) Field of Classification Search
CPC ........ H04N 5/235; H04N 5/247; H04N 5/335; H04N 5/378; H04N 5/3559; H04N 9/045; H04N 5/3651; H04N 5/3456
USPC ........ 348/308, 294, 229, 241; 257/291, 292, 257/443, 239; 250/208.1
See application file for complete search history.

(56) References Cited

U.S. PATENT DOCUMENTS

| | | | | |
|---|---|---|---|---|
| 2008/0180555 | A1* | 7/2008 | Sato | H04N 5/3452 348/248 |
| 2009/0109312 | A1* | 4/2009 | Noda | H04N 3/1512 348/304 |
| 2010/0134667 | A1* | 6/2010 | Suzuki | H04N 5/3572 348/294 |
| 2012/0013780 | A1* | 1/2012 | Mo | H04N 5/347 348/308 |
| 2012/0200753 | A1* | 8/2012 | Endoh | H04N 5/3742 348/301 |

\* cited by examiner

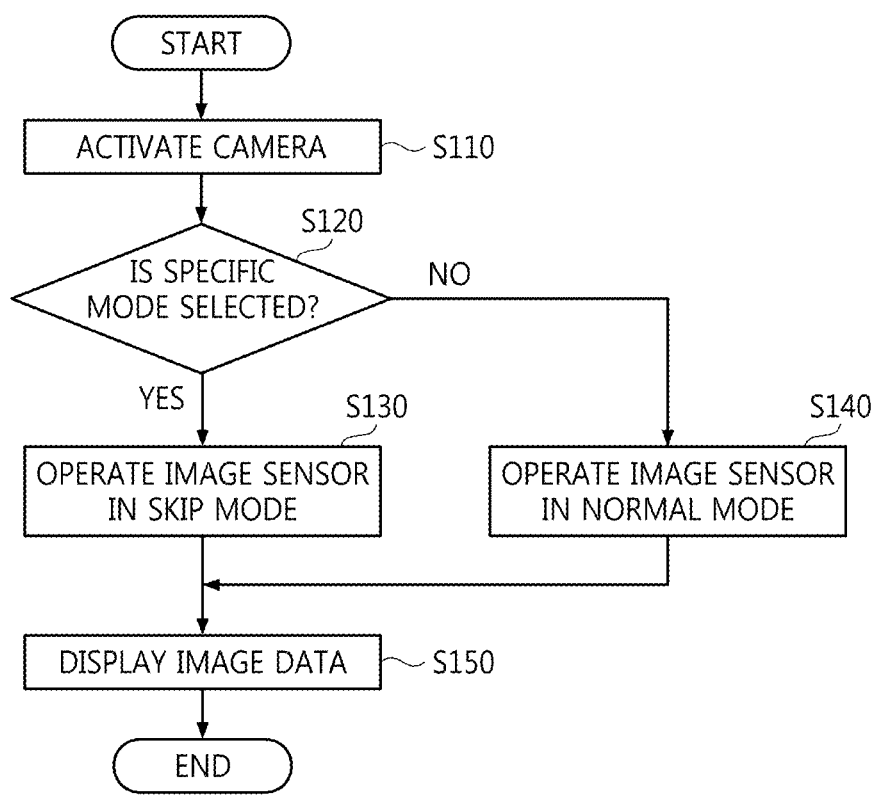

IMAGE SENSOR FOR REDUCING CHANNEL VARIATION AND IMAGE PROCESSING SYSTEM INCLUDING THE SAME

CROSS-REFERENCE TO RELATED APPLICATION

This application claims the priority benefit under 35 U.S.C. §119 of Korean Patent Application No. 10-2014-0183534 filed on Dec. 18, 2014 in the Korean Intellectual Property Office, the disclosure of which is incorporated herein by reference in its entirety.

TECHNICAL FIELD

The present disclosure generally relates to image sensors. More particularly, and not by way of limitation, particular embodiments of the inventive aspect disclosed in the present disclosure are directed to an image sensor for reducing channel variation between colors in a sub-sampling mode, and an image processing system including the same.

BACKGROUND

Complementary Metal-Oxide Semiconductor (CMOS) image sensors are solid-state imaging devices. CMOS image sensors are inexpensive to manufacture and have a small size, which reduces power consumption as compared to Charge-Coupled Device (CCD) image sensors employing high-voltage analog circuits consuming more power. Due to their improved performance and lower power consumption, CMOS image sensors are used in many electronic systems including portable devices, such as smart phones, digital cameras, etc.

SUMMARY

Channel variation between colors may, however, occur due to internal elements of a CMOS image sensor while the CMOS image sensor is operated. The channel variation is one of the factors that degrades the quality of an image. For example, a camera's Live-View (LV) mode generally increases power consumption in the camera's image sensor. An LV mode also may be known as a "preview mode." To decrease such power consumption in the LV mode, a sub-sampling based method of reading out pixel data of the image sensor may be used. The sub-sampling also may increase the image sensor's frame rate (measured in frames per second (fps)) in the LV mode. The frame rate may be, for example, 60 fps or more. The sub-sampling may be performed such that a pixel current source for the (pixel) columns that are to be skipped (i.e., the columns that are not to be read out) is controlled to be off so as to decrease power consumption. However, in the case of such sub-sampling, the outputs of the skipped pixels are floated and, hence, channel variation between colors in adjacent pixel columns may occur due to inter-column capacitive coupling.

It is therefore desirable to devise a circuit operable during sub-sampling to prevent floating of pixel outputs of columns that are to be skipped, thereby minimizing the channel variation between colors in the sub-sampling mode.

According to particular exemplary embodiments of the present disclosure, an image sensor includes: (i) first to $m^{th}$ pixels, each of which is connected to a corresponding column line from among first to $m^{th}$ column lines and is configured to output a respective pixel signal, wherein 'm' denotes an integer that is equal to or greater than '2'; (ii) first to $m^{th}$ bias circuits, each of which is connected to a corresponding column line from among the first to $m^{th}$ column lines and is configured to fix a voltage of the corresponding column line to a bias voltage when a column line-specific pixel is not selected to output the respective pixel signal; and (iii) an analog-to-digital converter configured to convert the pixel signals into digital signals.

In one exemplary embodiment, the bias voltage may be equal to a supply voltage applied to the first to $m^{th}$ pixels.

In one exemplary embodiment, the image sensor may further include first to $m^{th}$ switches, each switch connected to a corresponding one of the first to $m^{th}$ column lines and configured to be opened or closed in response to a respective one of first to $m^{th}$ column selection signals. Thus, for example, switches connected to the column lines of the non-selected pixels may be opened, whereas switches connected to the column lines of the selected pixels may be closed.

In one exemplary embodiment, each of the first to $m^{th}$ bias circuits may include a transistor connected between the corresponding column line and a bias voltage source and the transistor may be configured to be operated in response to a corresponding column selection signal from among the first to $m^{th}$ column selection signals. In particular embodiments, the transistor in each of the first to $m^{th}$ bias circuits may be a P-channel Metal Oxide Semiconductor (PMOS) transistor.

In another exemplary embodiment, the bias circuits connected to the column lines of the non-selected pixels may be turned on, whereas the bias circuits connected to the column lines of the selected pixels may be turned off.

According to certain embodiments of the present disclosure, an image processing system comprises: (i) an image sensor that includes first to $m^{th}$ pixels, each of which is connected to a corresponding column line from among first to $m^{th}$ column lines and is configured to output a respective one of first to $m^{th}$ pixel signals, wherein 'm' denotes an integer that is equal to or greater than '2'; and (ii) a processor configured to control the image sensor. In the image processing system, the image sensor is configured to perform the following: (i) output some of the first to $m^{th}$ pixel signals in a skip mode; and (ii) output all of the first to $m^{th}$ pixel signals in a normal mode. In the skip mode, voltage of a column line associated with a non-selected pixel is fixed to a bias voltage.

In particular embodiments, the image sensor in the image processing system may include the earlier-mentioned first to $m^{th}$ bias circuits to fix the voltages of the corresponding column lines of non-selected pixels to the bias voltage; and an analog-to-digital converter configured to convert the first to $m^{th}$ pixel signals into digital signals.

In one embodiment, the present disclosure relates to a method that comprises: (i) activating an image sensor having a plurality of pixels arranged in multiple rows and columns of pixels, wherein each pixel in a row of pixels is connected to a respective column line that is configured to output a pixel-specific signal; (ii) determining that the image sensor is being operated in a skip mode, wherein, in the skip mode, pixel-specific signals from some of the column lines are not selected to be output; and (iii) in response to the determination, establishing a pre-determined bias voltage on a column line associated with a pixel in the row of pixels whose pixel-specific signal is not to be output during the skip mode.

BRIEF DESCRIPTION OF THE DRAWINGS

Exemplary embodiments of the present disclosure will be more clearly understood from the following detailed description taken in conjunction with the accompanying drawings, in which:

FIG. 11 is an example flowchart of a method of operating an image processing system including the image sensor of FIG. 1 according to particular embodiments of the present disclosure.

DETAILED DESCRIPTION OF THE EMBODIMENTS

Figure 1:
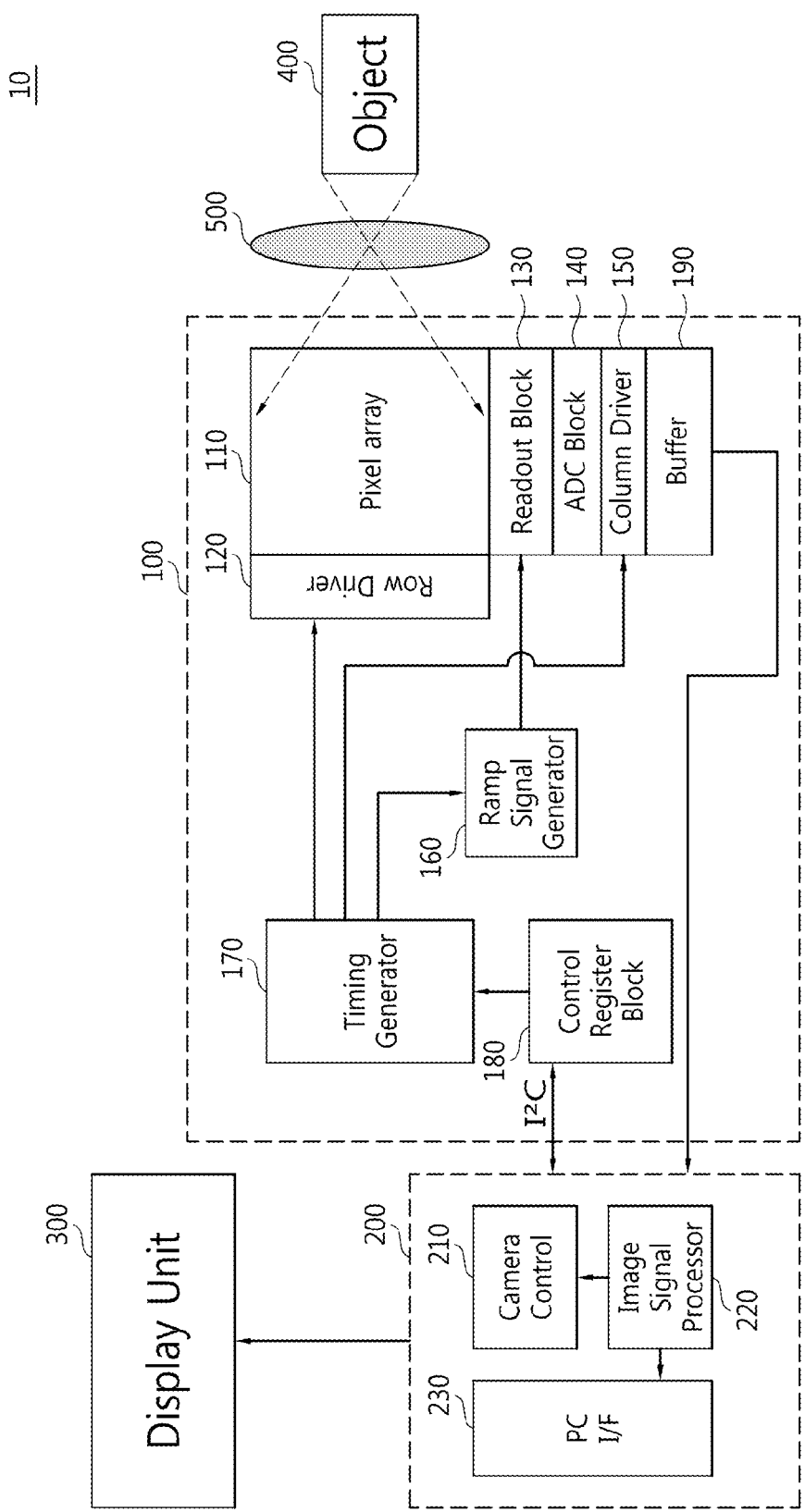
FIG. 1 is an exemplary block diagram of an image processing system including an image sensor according to one embodiment of the present disclosure.

The present disclosure now will be described more fully hereinafter with reference to the accompanying drawings, in which various embodiments of the present disclosure are shown. The teachings of the present disclosure, however, may be embodied in many different forms and should not be construed as limited to the embodiments set forth herein. Rather, these embodiments are provided so that this disclosure will be thorough and complete, and will fully convey the scope of the teachings to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or through one or more intervening elements. In contrast, when an element is referred to as being "directly connected" or "directly coupled" to another element, there are no intervening elements present. In the context of the discussion herein, the coupling or connection between two elements may be primarily electrical. As used herein, the term "and/or" includes any and all combinations of one or more of the associated listed items.

It will be understood that, although the terms "first", "second", etc., may be used herein to describe various elements, these elements should not be limited by these terms. These terms are only used to distinguish one element from the other and, hence, these terms should not be construed to imply any specific order or sequence of these elements, unless noted otherwise or dictated by the context of discussion. For example, a "first signal" could be termed a "second signal", and, similarly, a "second signal" could be termed a "first signal" without departing from the teachings of the disclosure.

The terminology used herein is for the purpose of describing particular embodiments only and is not intended to be limiting of the teachings of the present disclosure. As used herein, the singular forms "a", "an" and "the" are intended to include the plural forms as well, unless the context clearly indicates otherwise. It will be further understood that the terms "comprises" and/or "comprising," or "includes" and/or "including", or other such terms of similar import, when used in this specification, refer to the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and should not be interpreted in an idealized or overly formal sense unless expressly so defined herein.

FIG. 1 is an exemplary block diagram of an image processing system 10 including an image sensor 100 according to one embodiment of the present disclosure. Referring to FIG. 1, the image processing system 10 may also include an image processor (e.g., a Digital Signal Processor (DSP)) 200, a display unit 300, and a lens 500. In particular embodiments, the image processing system 10 may be a computer, a tablet, a cellular phone, a User Equipment (UE), a smartphone, a machine vision system, a robot, or any other device or system with a camera (not shown) and a display screen to capture and display an image. For the sake of brevity and ease of discussion, only those components or elements in FIG. 1 that are more relevant to the present disclosure will be described in any appreciable detail below. Furthermore, for ease of reference, a portion of the discussion of FIG. 1 may be provided with reference to FIG. 2, which is an exemplary diagram that illustrates a portion of the structure of the image sensor 100 of FIG. 1 in more detail.

The image sensor 100 may include a pixel array 110, a row driver 120, a readout (RO) block 130, an Analog-to-Digital Converter (ADC) block 140, a column driver 150, a ramp signal generator 160, a timing generator 170, a control register block 180, and a buffer 190.

The image sensor 100 may sense an image of an object 400 captured via the lens 500 under the control of the DSP 200. The DSP 200 may output a processed (final) image, which is initially sensed by and received from the image sensor 100, to the display unit 300. Examples of the display unit 300 may include displays in the devices or image processing systems 10 capable of outputting an image. For example, the display unit 300 may be embodied in a computer, a mobile phone, an electronic device with a camera, etc.

In the embodiment of FIG. 1, the DSP 200 may include a camera control 210, an image signal processor (ISP) 220, and a Personal Computer Interface (PC I/F) 230. The camera control 210 controls the control register block 180. The camera control 210 may control the image sensor 100 (for example, through the control register block 180) by using an Inter-Integrated Circuit (I²C) interface, but the exemplary embodiments of the present disclosure are not limited thereto.

The ISP 220 receives image data which is an output signal of the buffer 190, processes/handles the image data to be seen to human eyes, and outputs the processed/handled image data to the display unit 300 via the PC I/F 230.

Although FIG. 1 illustrates that the ISP 220 is included in the DSP 200, the location of the ISP 220 may be changed by those of ordinary skill in the art. For example, in certain embodiments, the ISP 220 may be included in the image sensor 100.

The pixel array 110 may include a plurality of pixels (e.g., pixels P11 to Pnm 115 of FIG. 2), each of which may include a photoelectric conversion device, e.g., a photo diode, a pinned photo diode, etc. Exemplary structural details of a pixel are shown in FIGS. 3A-3E, which are discussed later below. The photoelectric conversion device may sense light and convert the incident light into an electrical signal so as to generate an image signal.

The timing generator 170 may control operations and timings of the row driver 120, the ramp signal generator 160, and the column driver 150 by outputting appropriate control signals or clock signals thereto. The control register block 180 may provide the timing generator 170 with a control signal or a clock signal received from the DSP 200 over the I²C interface.

Figure 2:
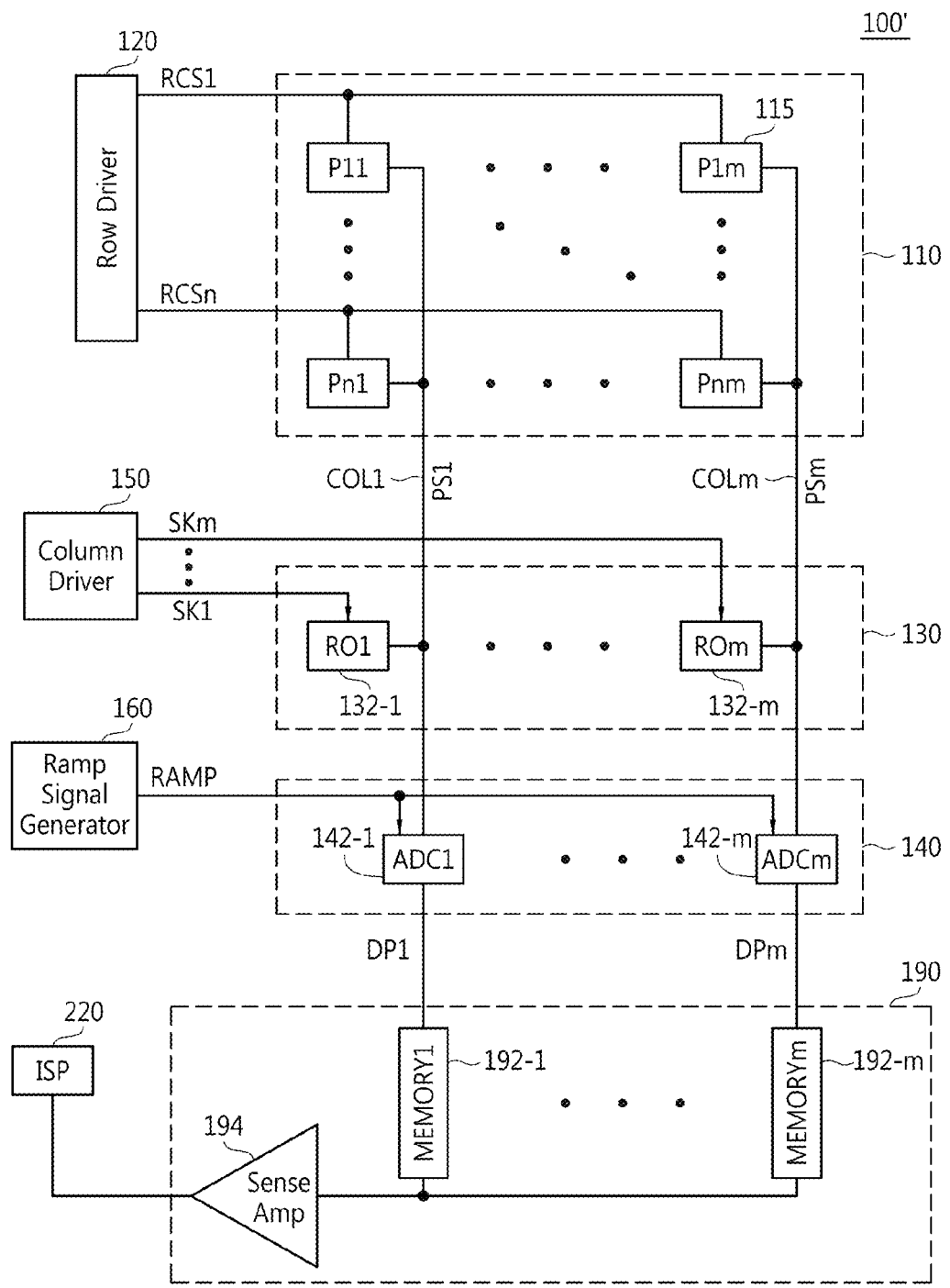
FIG. 2 is an exemplary diagram illustrating in more detail a portion of the structure of the image sensor of FIG. 1.

The row driver 120 may drive the pixel array 110 in units of rows. For example, the row driver 120 may generate row control signals (e.g., row control signals RCS1 to RCSn of FIG. 2) for respectively controlling the plurality of pixels P11 to Pnm 115 (FIG. 2) of the pixel array 110. Thus, the pixel array 110 may be an n×m pixel array in the sense that the pixel array 110 may comprise "n" rows of pixels, each row having "m" pixels as shown in FIG. 2. The pixel array 110 may output, to the ADC block 140, pixel signals (e.g., pixel signals PS1 to PSm of FIG. 2) from rows of pixels selected by the row control signals RCS1 to RCSn generated by the row driver 120. The pixel signals PS1 to PSm of FIG. 2 may be analog pixel signals.

The ADC block 140 may convert the analog pixel signals (the pixel signals PS1 to PSm of FIG. 2) output from the pixel array 110 into corresponding digital pixel signals (e.g., pixel signals DP1 to DPm of FIG. 2), and may send the digital pixel signals to the buffer 190. In the embodiment of FIG. 1, the ADC block 140 may convert the analog pixel signals (the pixel signals PS1 to PSm of FIG. 2) into the respective digital pixel signals (the pixel signals DP1 to DPm of FIG. 2) by using a ramp signal (e.g., a ramp signal RAMP of FIG. 2) provided from the ramp signal generator 160. However, in other embodiments, different methods may be employed to convert analog pixel signals into digital ones. For example, in one embodiment, when the ADC block 140 converts the analog pixel signals (the pixel signals PS1 to PSm of FIG. 2) into the digital pixel signals (the pixel signals DP1 to DPm of FIG. 2) by using a different method, the ramp signal generator 160 may not be included in the image sensor 100.

Under the operative control of the timing generator 170, the column driver 150 may control operations of the readout block 130, the ADC block 140, and the buffer 190. In other words, in particular embodiments, the column driver 150 may control whether the pixel signals are to be output from or not from columns of the pixel array 110, and may also control the timings when digital pixel signals are to be generated and output.

The buffer 190 may temporarily store the digital pixel signals (the pixel signals DP1 to DPm of FIG. 2) output from the ADC block 140, and sense, amplify, and output the digital pixel signals to the ISP 220 as illustrated in FIGS. 1-2.

In the embodiment of FIG. 1, the image sensor 100 includes the ADC block 140 therein, which converts the analog pixel signals (the pixel signals PS1 to PSm of FIG. 2) into the corresponding digital pixel signals (the pixel signals DP1 to DPm of FIG. 2). These digital pixel signals may be then provided to the image processor (DSP) 200, but exemplary embodiments of the present disclosure are not limited thereto.

In one exemplary embodiment, the image sensor 100 may not include the ADC block 140 therein, in which case the image sensor 100 may provide the analog pixel signals (the pixel signals PS1 to PSm of FIG. 2) to an external unit for further processing, such as, for example, to the DSP 200. In this case, the DSP 200 may receive the analog pixel signals (the pixel signals PS1 to PSm of FIG. 2) and convert them into digital pixel signals.

Also, in certain embodiments, the image sensor 100 may include one or more devices (e.g., capacitors) configured to temporarily store the analog pixel signals (the pixel signals PS1 to PSm of FIG. 2) instead of the buffer 190 configured to temporarily store the digital pixel signals (the pixel signals DP1 to DPm of FIG. 2).

FIG. 2 is an exemplary diagram illustrating in more detail a portion of the structure of the image sensor 100 of FIG. 1. Such portion is identified using the reference numeral 100' in FIG. 2, and the same reference numerals are used in FIGS. 1 and 2 to refer to the common elements. FIGS. 3A to 3E are circuit diagrams providing different examples of pixels 115 of FIG. 2 according to particular embodiments of the present disclosure. FIGS. 4A and 4B are circuit diagrams illustrating examples of the readout unit 130 of FIG. 2 according to various embodiments of the present disclosure. In the discussion below, FIGS. 1-4 may be collectively referenced for ease of description.

The image sensor 100' in FIG. 2 is shown to include the pixel array 110, the row driver 120, the ADC block 140, the column driver 150, the ramp signal generator 160, and the buffer 190.

The pixel array 110 in FIG. 2 is shown in more detail to include the pixels P11 to Pnm 115 connected to a plurality of row lines and a plurality of column lines COL1 to COLm, as shown. For ease of discussion and reference, all of the pixels P11 to Pnm in FIG. 2 are collectively identified using the single reference numeral "115." Also, for ease of illustration, only two column lines are individually shown in FIG. 2—the first column line marked as "COL1" and the m$^{th}$ column line marked as "COLm." The corresponding column-specific pixel signals are indicated as "PS1" and "PSm."

Although not shown, in the pixel array 110, a semiconductor substrate, an interlayer insulating layer, a color filter layer, and microlenses may be stacked in a vertical direction. The semiconductor substrate may be a semiconductor substrate, in which a p-type epitaxial layer is formed on a p-type bulk silicon substrate and n-type ions may be implanted into the p-type epitaxial layer to form a pixel-specific photo diode (not shown). Also, the interlayer insulating layer may be stacked on the semiconductor substrate. The interlayer insulating layer may include gates of transistors of each unit pixel, and multiple layers of conductive lines. In one exemplary embodiment, a protective layer (not shown) may be stacked on the interlayer insulating layer to protect the circuit elements of the pixel array 110. The color filter layer may be stacked on the interlayer insulating layer (or the protective layer), and may include a plurality of color filters. In one exemplary embodiment, Bayer pattern technology may be applied to the color filter layer. For example, the plurality of color filters may include at least one red filter, at least one green filter, and at least one blue filter arranged in the Bayer pattern, or may include at least one magenta filter, at least one cyan filter, and at least one yellow filter arranged in the Bayer pattern. In one exemplary embodiment, a planarization layer, which may be also referred to as an over-coating layer, may be stacked on the color filter layer. The microlenses may be stacked on the color filter layer (or the planarization layer). The microlenses may guide incident light to be efficiently incident on a photo diode (not shown) of the unit pixel.

Each row of the pixels P11 to Pnm 115 may be sequentially activated according to the row control signals RCS1 to RCSn from the row driver 120 to respectively output the pixel signals PS1 to PSm to the column lines COL1 to COLm.

Various embodiments of the plurality of pixels P11 to Pnm 115 are illustrated in FIGS. 3A to 3E. Any of the pixel configurations shown in FIGS. 3A-3E may be used for each pixel 115. For example, in one embodiment, each pixel 115 may have the pixel configuration shown in FIG. 3A. Alternatively, in another embodiment, each pixel 115 may have the configuration shown in FIG. 3B, and so on. The reset control signal RS, the transfer gate/control signal TG, the selection control signal SEL, and the photo gate signal PG shown in the pixel configurations of FIGS. 3A-3E may be included as part of each of the row control signals RCS1 to RCSn, as needed.

Figure 3A:
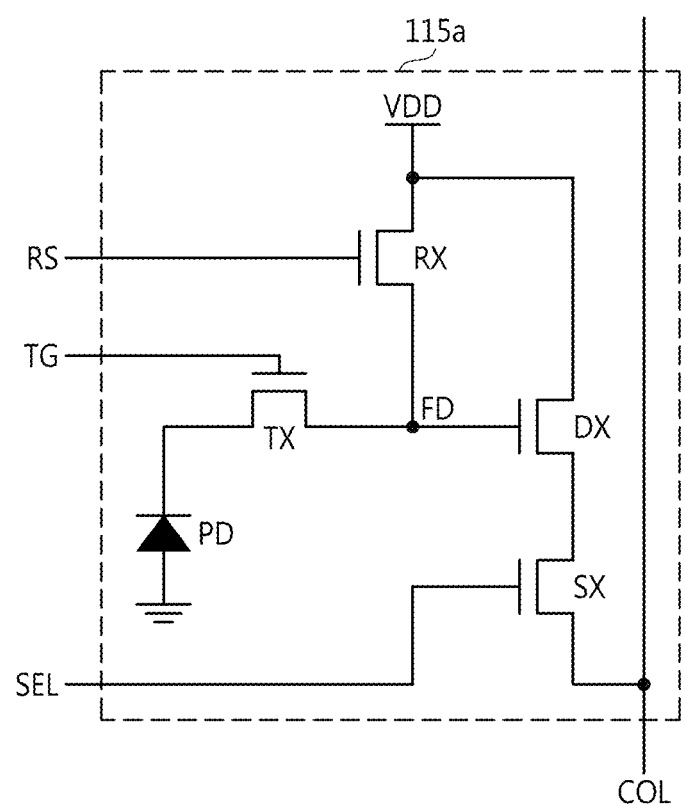
FIGS. 3A to 3E are circuit diagrams providing different examples of pixels of FIG. 2 according to particular embodiments of the present disclosure.
Figure 4A:
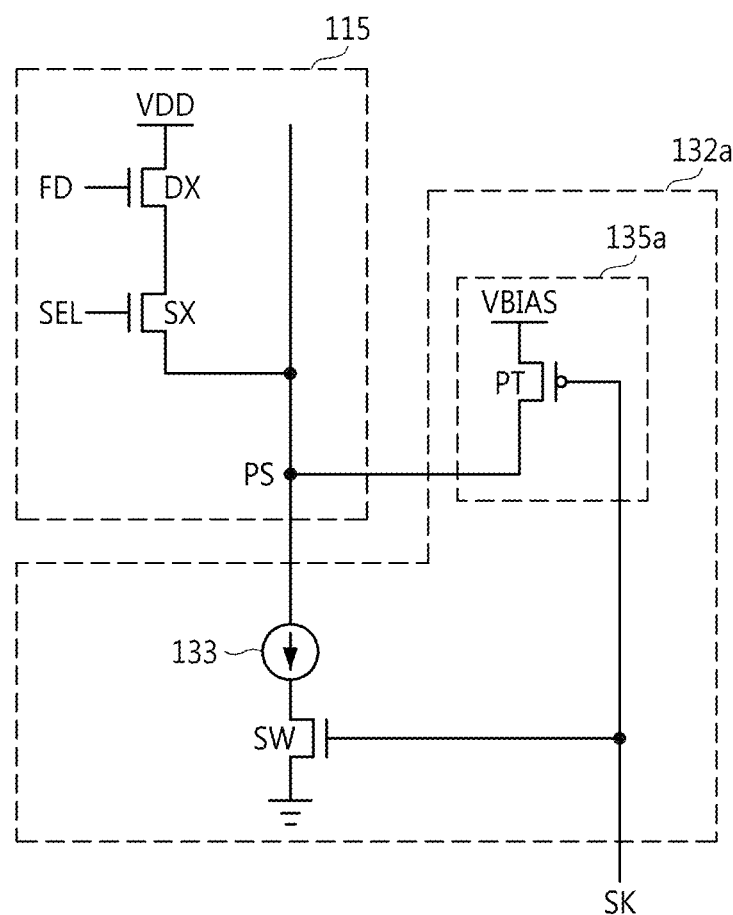
FIGS. 4A and 4B are circuit diagrams illustrating examples of a readout unit of FIG. 2 according to various embodiments of the present disclosure.
Figure 4B:
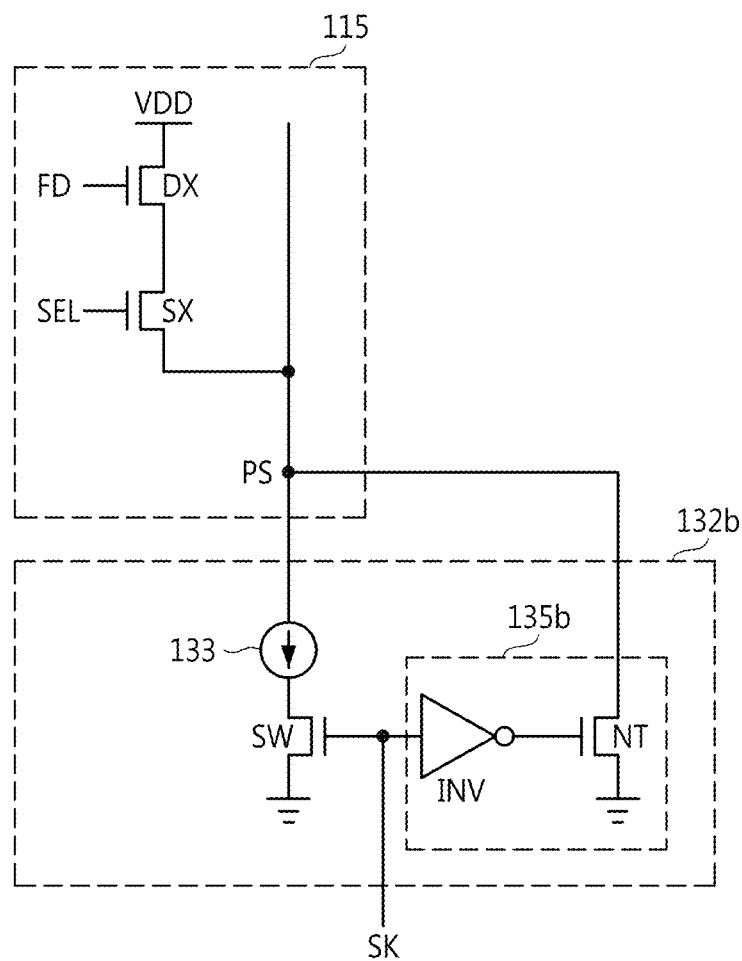

In the pixel configuration of FIG. 3A, each pixel 115*a* may include a photo diode PD, a transfer transistor TX, a floating diffusion node FD, a reset transistor RX, a drive transistor DX, and a selection transistor SX.

In the discussion herein, a photo diode PD is an example of a photoelectric conversion device, which may be, for example, a photo transistor, a photo gate, a pinned photo diode (PPD), and the like.

Although FIG. 3A illustrates a 4-transistor (4T) unit pixel including one photo diode PD and four MOS transistors TX, RX, DX, and SX, other exemplary embodiments of the present disclosure are not limited thereto. For example, particular embodiments of the present disclosure are applicable to various circuits that include at least three transistors (including the drive transistor DX and the selection transistor SX) and a photo diode PD.

The operation of the pixel 115*a* will be described now. The photo diode PD may store and retain photocharges generated according to the intensity of light incident from the object 400. The transfer transistor TX may transmit the photocharges to the floating diffusion node FD according to the transfer control signal TG output from the row driver 120 (as part of an appropriate RCS signal).

The drive transistor DX may amplify and transmit the photocharges accumulated in the floating diffusion node FD to the selection transistor SX. The drain terminal of the drive transistor DX may be biased to a fixed, pre-determined electric potential VDD, as shown.

The selection transistor SX may have its drain terminal connected to the source terminal of the drive transistor DX, and may output an output signal (or pixel signal PS) to a column line COL connected to the pixel 115*a*. The selection transistor SX may provide the output/pixel signal according to the selection control signal SEL output from the row driver 120. The column line COL may be any one of the column lines COL1 to COLm illustrated in FIG. 2. The output signal may be any one of the pixel signals PS1 to PSm illustrated in FIG. 2.

The reset transistor RX may reset a voltage of the floating diffusion node FD to a supply voltage VDD in response to the reset control signal RS output from the row driver 120.

The output/pixel signal provided by the selection transistor SX may be a reset signal or an image signal. The reset signal may be output from the selection transistor SX after the voltage of the floating diffusion node FD is reset to the supply voltage VDD by the reset transistor RX. The image signal may be output from the selection transistor SX after the transmission of the photocharges to the floating diffusion node FD from the transfer transistor TX is completed. The pixel 115*a* may sequentially output the reset signal and the image signal under the operative control of the row driver 120.

Some additional embodiments of the plurality of pixels P11 to Pnm 115 are illustrated in FIG. 3B to 3E. As mentioned before, in certain embodiments, each of the pixels 115 may have the pixel configuration shown in FIG. 3B. In other embodiments, each pixel 115 may have the configuration shown in FIG. 3C, and so on.

Figure 3B:
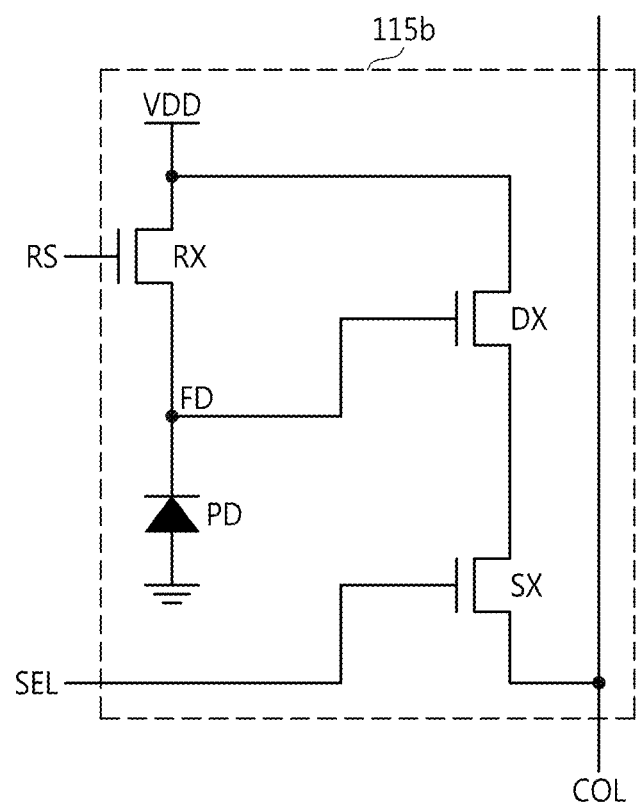

In the pixel configuration of FIG. 3B, each pixel 115*b* may be a 3-transistor (3T) pixel including a photo diode PD, a reset transistor RX, a drive transistor DX, and a selection transistor SX. As in case of the pixel 115*a* in FIG. 3A, photocharges generated by the photo diode PD in the pixel 115*b* in FIG. 3B may be accumulated in a floating diffusion node FD, and an output signal may be output to a column line COL according to operations of the drive transistor DX and the selection transistor SX.

Figure 3C:
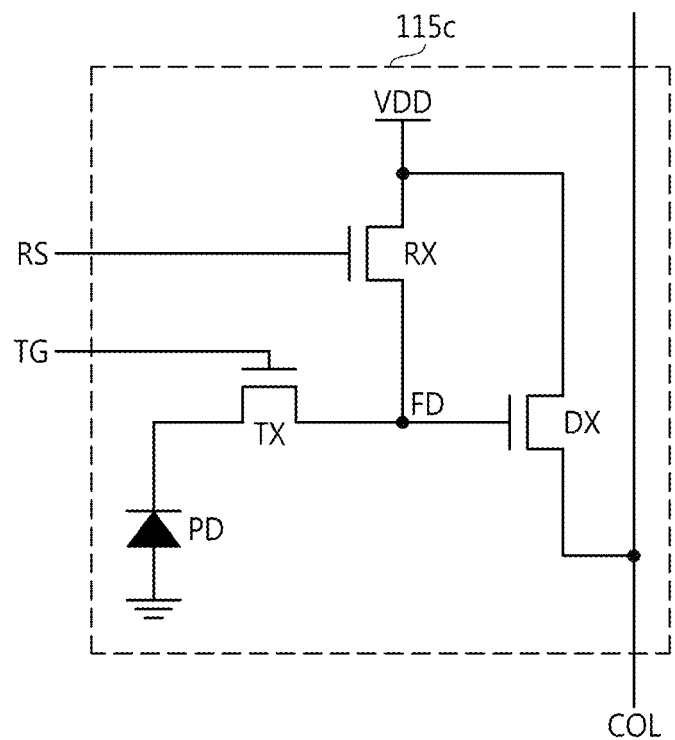

In the pixel configuration of FIG. 3C, each pixel 115*c* may be a 3T pixel including a photo diode PD, a transfer transistor TX, a reset transistor RX, and a drive transistor DX. The reset transistor RX may be embodied as an n-channel depression type transistor. Like the embodiments in FIGS. 3A-3B, the reset transistor RX in the embodiment of FIG. 3C also may reset the voltage of the floating diffusion node FD to the supply voltage VDD or set the voltage of the floating diffusion node FD to a low voltage, e.g., 0 V, according to the reset control signal RS received from the row driver 120. As noted before, the RS signal may be sent to the pixel 115*c* via a corresponding RCS signal from the row driver 120.

Figure 3D:
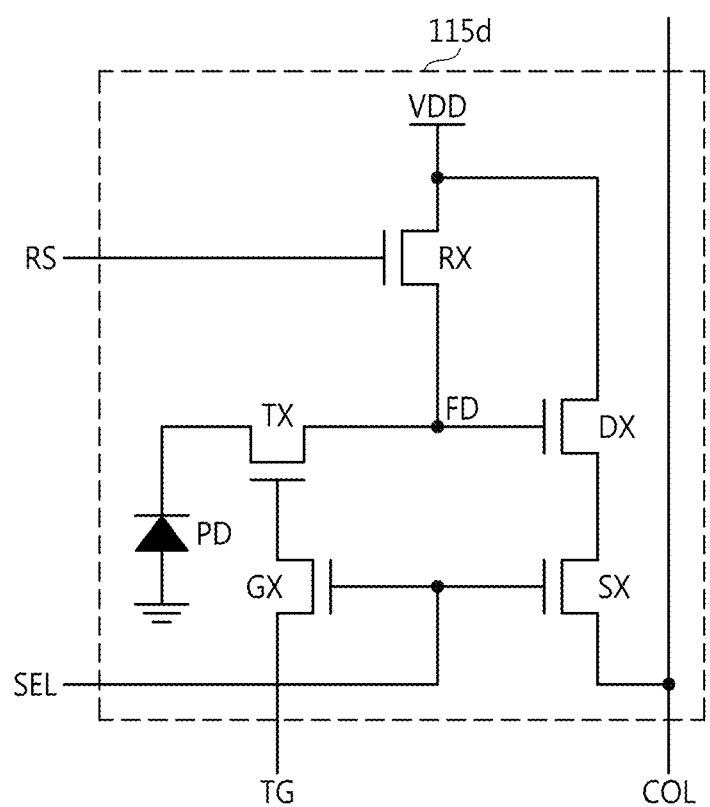

In the pixel configuration of FIG. 3D, each pixel 115*d* may be a 5-transistor (5T) pixel including a photo diode PD, a reset transistor RX, a transfer transistor TX, a drive transistor DX, a selection transistor SX, and a gate transistor GX. The operation of the pixel 115*d* under the control signals RS, TG, and SEL may be substantially similar to that of the pixel 115*a* in FIG. 3A and, hence, additional discussion of FIG. 3D is not provided herein.

Figure 3E:
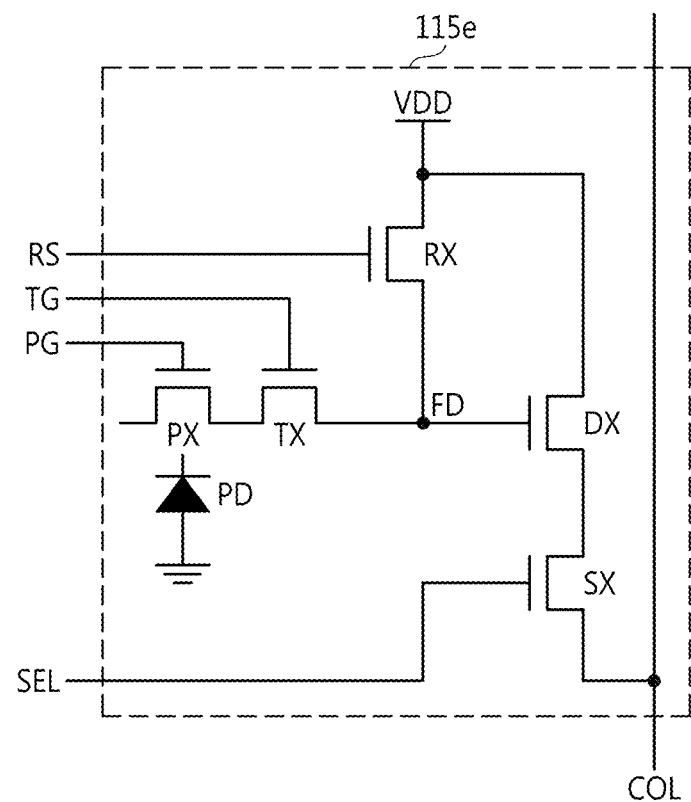

In the pixel configuration of FIG. 3E, each pixel 115*e* also may be a 5T pixel including a photo diode PD, a reset transistor RX, a drive transistor DX, a selection transistor SX, a transfer transistor TX, and a photo transistor PX. The photo transistor PX may output photocharges to a transfer transistor TX according to the photo gate signal PG received from the row driver 120. As noted before, the PG signal may be sent to the pixel 115e via a corresponding RCS signal from the row driver 120.

Referring again to FIG. 2, the row driver 120 may select at least one row line among the "n" row lines of the pixel array 110 by using the appropriate row control signals RCS1 to RCSn.

As shown in FIG. 2, the readout block 130 may include first to $m^{th}$ readout (RO) units 132-1 to 132-m. Thus, there may be one RO unit corresponding to each different one of the "m" columns of pixels.

Each of the first to $m^{th}$ readout units 132-1 to 132-m may be connected to a corresponding column line from among the first to $m^{th}$ column lines COL1 to COLm, as shown in the exemplary embodiment of FIG. 2.

Each of the first to $m^{th}$ readout units 132-1 to 132-m may have the same structure as a readout unit 132a of FIG. 4A or a readout unit 132b of FIG. 4B. For example, in one embodiment, each RO unit 132-1 to 132-m may have a configuration similar to the exemplary RO unit 132a in FIG. 4A. In another embodiment, all RO units 132-1 to 132-m may be similar to the RO unit 132b in FIG. 4B. For ease of illustration, only an exemplary output portion is shown for the pixel 115 in the embodiments of FIGS. 4A-4B instead of the entire pixel structure (which may be any of the configurations shown in FIGS. 3A-3E, as noted before).

Referring now to FIG. 4A, the readout unit 132a according to an embodiment of the present disclosure may include a current source 133, a switch SW, and a bias circuit 135a. As discussed in more detail below, in particular embodiments, the bias circuit 135a prevents floating of pixel outputs of columns that are skipped during sub-sampling.

The current source 133 may be connected to a corresponding column line from among the first to $m^{th}$ column lines COL1 to COLm to supply a predetermined amount of current to the corresponding column line. The switch SW may be connected between the current source 133 and the ground, and may be opened or closed in response to a column selection signal SK.

In one exemplary embodiment, the switch SW may be embodied as an N-channel MOS (NMOS) transistor, but is not limited thereto. For example, the switch SW may be embodied as a PMOS transistor and the location of the switch SW may be changed in certain embodiments.

In one embodiment, the switch SW is opened when the corresponding column line is not selected, i.e., when an output signal PS of the corresponding column line is not being output. On the other hand, the switch SW is closed when the corresponding column line is selected, i.e., when the output signal PS of the corresponding column line is being output from the respective pixel. The switch SW may be operative under the control of the column selection signal SK, as shown.

When the corresponding column line is not selected, the switch SW is opened and, hence, the bias circuit 135a may fix the voltage of the corresponding column line to a bias voltage VBIAS. On the other hand, when a column line is selected by the SK signal, the switch SW is closed, thereby "deactivating" the bias circuit 135a and facilitating the output of the pixel signal PS.

As shown in FIG. 4A, the bias circuit 135a may be embodied as, but is not limited to, a PMOS transistor PT connected between the corresponding column line and the bias voltage VBIAS source and operated in response to the column selection signal SK.

The bias voltage VBIAS may be equal to the supply voltage VDD shown in the embodiments of FIGS. 3A-3E. The supply voltage VDD may be applied to pixels P11 to P1m of the pixel array 100. In particular embodiments, however, the bias voltage VBIAS may be different from the supply voltage.

Similarly, FIG. 4B shows another embodiment for a readout unit. Referring to FIG. 4B, the readout unit 132b according to some embodiments of the present disclosure may include the current source 133, a switch SW, and a bias circuit 135b. The readout unit 132b of FIG. 4B is substantially the same as the readout unit 132a of FIG. 4A and, hence, the discussion below will focus only on the differences between these two readout units.

The readout unit 132b of FIG. 4B may be connected between a corresponding column line and the ground, and may include an NMOS transistor NT which is operated in response to an inverted column selection signal SKB. As shown, the SKB signal may be generated using an inverter INV configured to invert the column selection signal SK and output the inverted column selection signal SKB.

The readout unit 132b of FIG. 4B fixes the voltage of the corresponding column line to a ground voltage when the corresponding column line is not selected. When the column line is not selected, the switch SW is opened and, as a result, the transistor NT conducts and fixes the voltage of the column line to the ground potential. As in case of FIG. 4A, when a column line is selected by the SK signal, the switch SW is closed, thereby "deactivating" the bias circuit 135b and facilitating the output of the pixel signal PS.

Referring now to FIG. 2, either of the RO unit configurations 132a or 132b may be used for the RO units 132-1 to 132-m in the embodiment of FIG. 2, as mentioned before. The ADC block 140 may include first to $m^{th}$ ADC units 142-1 to 142-m, as shown in FIG. 2.

Each of the first to $m^{th}$ ADC units 142-1 to 142-m may be connected to a corresponding column line among the first to $m^{th}$ column lines COL1 to COLm.

The first to $m^{th}$ ADC units 142-1 to 142-m may receive the ramp signal RAMP from the ramp signal generator 160, may also receive corresponding pixel signals from among the first to $m^{th}$ pixel signals PS1 to PSm, and may convert the corresponding pixel signals into digital pixel signals DP1 to DPm by using the ramp signal RAMP.

For example, each of the first to $m^{th}$ ADC units 142-1 to 142-m may compare the ramp signal RAMP with the corresponding pixel signal PS received by the ADC unit, generate a comparison signal (not shown) according to the result of the comparison, and count the comparison signal so as to generate the corresponding digital pixel signal DP1 to DPm. The digital pixel signals DP1 to DPm may be stored in the buffer 190.

The buffer 190 may include first to $m^{th}$ memories 192-1 to 192-m respectively connected to the first to $m^{th}$ ADC units 142-1 to 142-m, and a sense amplifier 194.

The first to $m^{th}$ memories 192-1 to 192-m may temporarily store the respective digital pixel signals DP1 to DPm and sequentially output them to the sense amplifier 194 under control of the column driver 150. The sense amplifier 194 may sense and amplify the digital pixel signals DP1 to DPm, and output the amplified digital pixel signals DP1 to DPm to the ISP 220.

The ISP 220 may process the digital pixel signals DP1 to DPm received from the sense amplifier 194.

Figure 5:
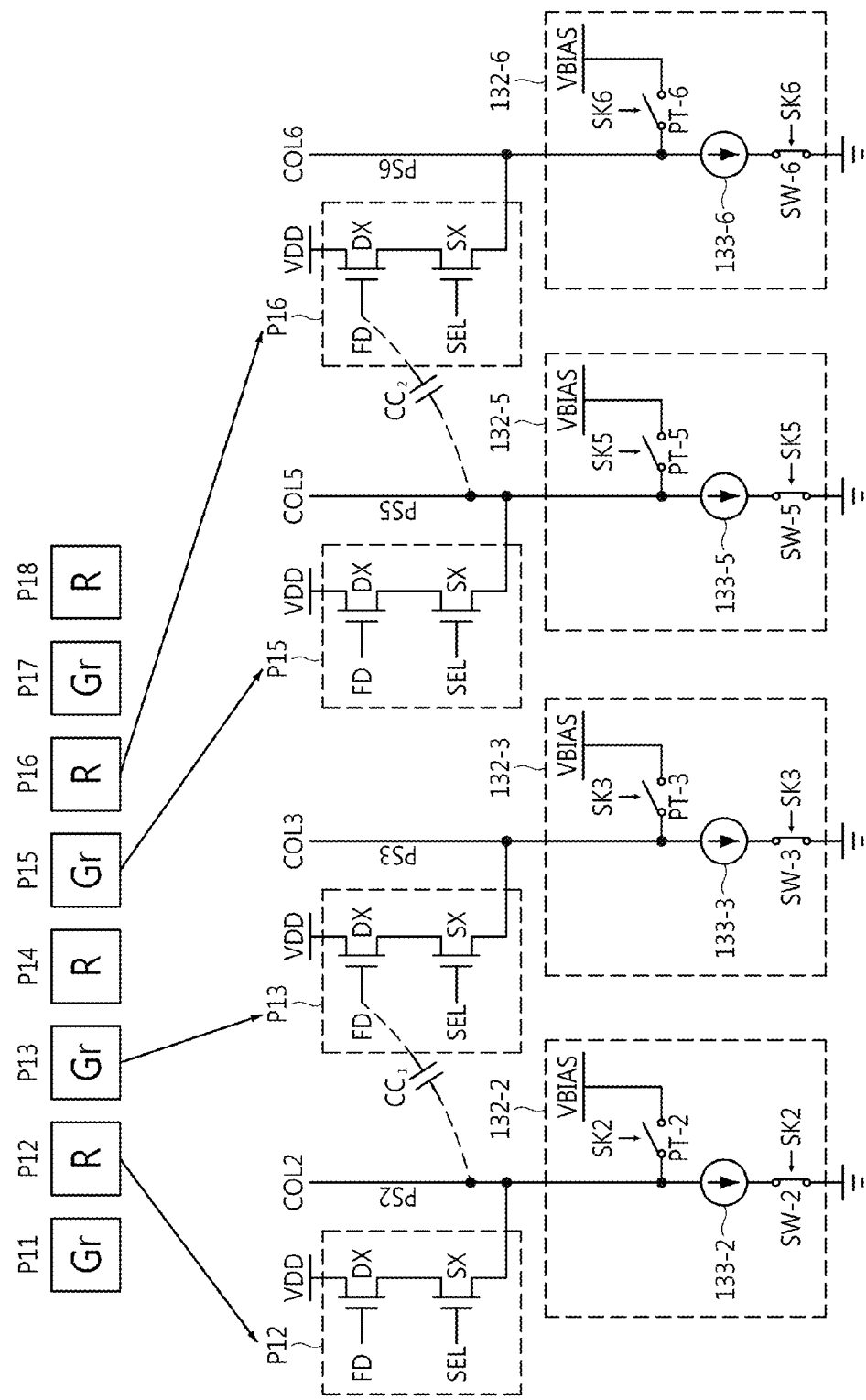
FIG. 5 is an exemplary diagram illustrating an operation of an image sensor in a normal mode according to one embodiment of the present disclosure.
Figure 6:
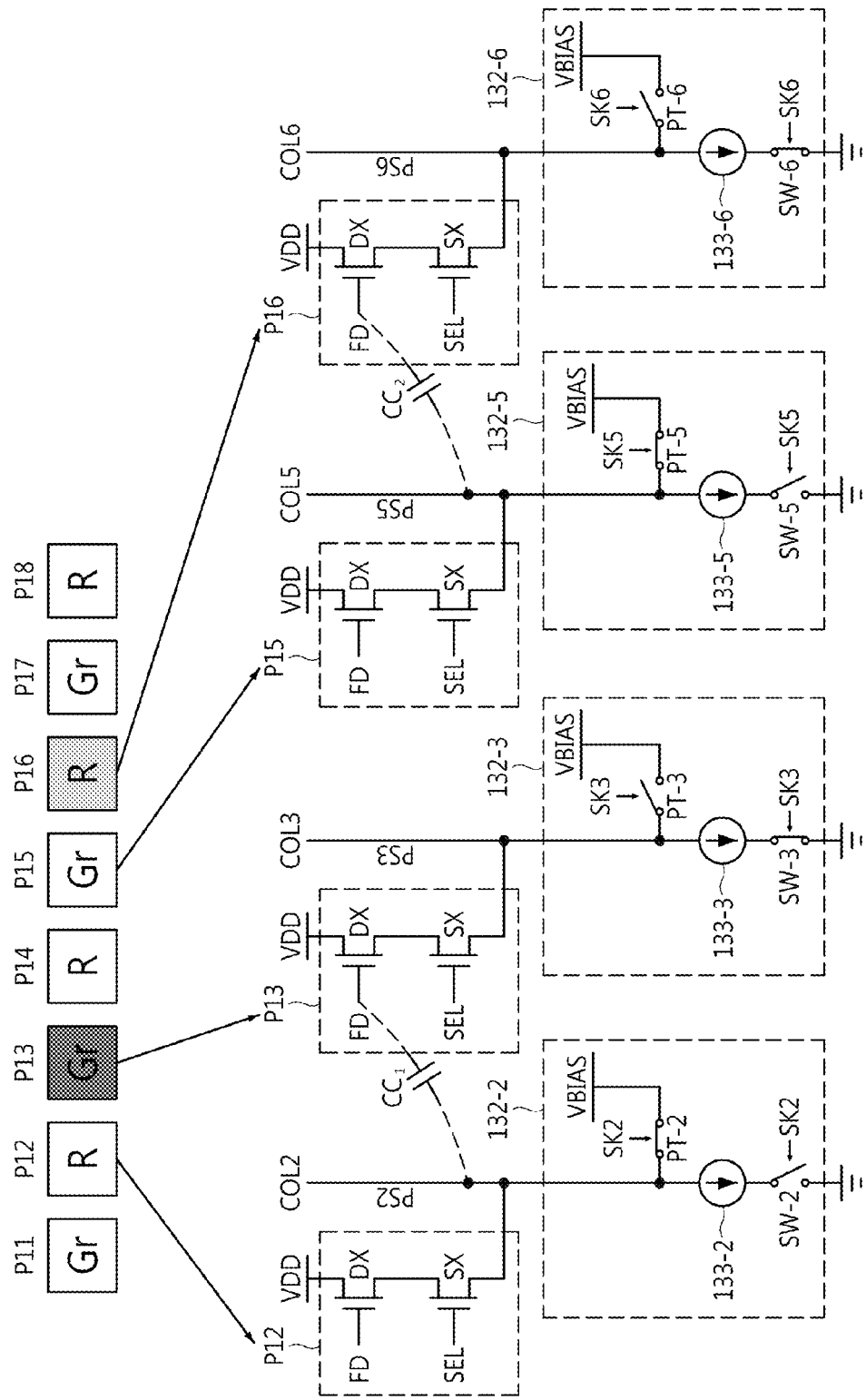
FIG. 6 is an exemplary diagram illustrating an operation of an image sensor in a skip mode according to one embodiment of the present disclosure.

FIG. 5 is an exemplary diagram illustrating an operation of an image sensor, like the image sensor 100 of FIG. 1, in a normal mode according to one embodiment of the present disclosure. FIG. 6 is an exemplary diagram illustrating an operation of an image sensor, like the image sensor 100 of FIG. 1, in a skip mode according to an embodiment of the present disclosure.

For convenience of explanation, FIGS. 5 and 6 each illustrate a portion of each of the second, third, fifth and sixth pixels P12, P13, P15, P16 from among the plurality of pixels P11 to Pnm 115 of FIG. 2, and the second, third, fifth and sixth readout units 132-2, 132-3, 132-5, 132-6 among the first to $m^{th}$ readout units 132-1 to 132-m of FIG. 2. Each of the capacitors $CC_1$ and $CC_2$ illustrated in FIGS. 5 and 6 denotes a parasitic capacitor between a column line and a floating diffusion node FD of a pixel adjacent to the column line.

First, referring to FIGS. 2 and 5, in the normal mode of the image sensor 100', the pixel signals may be output from all of the pixels in a selected row. FIG. 5 illustrates a partial circuit configuration for such a normal mode of operation.

As noted before, in one exemplary embodiment, the pixels P11 to Pnm 115 may be pixels arranged in an RGB Bayer pattern.

For example, as illustrated in FIG. 5, the first to eighth pixels P11 to P18 in a first row may be part of the Bayer pattern in which a green pixel Gr and a red pixel R are alternately arranged.

In the normal mode, when the first row is selected, all of the pixels P11 to P1m in the first row (which may be referred to as first to $m^{th}$ pixels P11 to P1m for convenience of explanation) may be selected. Thus, the pixel signals PS1 to PSm of FIG. 2 are output from the first to $m^{th}$ pixels P11 to P1m in the first row and are then input to the ADC block 140.

In the normal mode, all of the pixels P11 to P1m in the first row are selected and thus all bias circuits of the respective readout units 132-1 to 132-m are turned off as symbolically illustrated by the "deactivated" or "open" state of the transistors PT-2, PT-3, PT-5, and PT-6 in FIG. 5, and the closed state of the respective switches SW-2, SW-3, SW-5, and SW-6.

Referring now to FIGS. 2 and 6, in the skip mode of the image sensor 100', some of the pixels in a selected row may be selected and the other pixels may not be selected. FIG. 6 illustrates a partial circuit configuration for such a skip mode of operation.

As compared to the embodiment of FIG. 5, in the embodiment of FIG. 6, the third pixel P13 corresponding to the green pixel Gr and the sixth pixel P16 corresponding to the red pixel R are selected for sub-sampling but the first, second, fourth, fifth, seventh, and eighth pixels P11, P12, P14, P15, P17, and P18 are not selected.

Thus, in the embodiment of FIG. 6, the bias circuits of the readout units 132-3 and 132-6 corresponding to the selected pixels (which may be also referred to as 'on-pixels') are turned off—as symbolically illustrated by the "open" state of the transistors PT-3 and PT-6, and the closed state of the respective switches SW-3 and SW-6.

On the other hand, in the embodiment of FIG. 6, the bias circuits of the readout units 132-2 and 132-5 corresponding to the non-selected pixels (which may be also referred to as 'off-pixels') are turned on to fix output voltages of column lines corresponding thereto to the bias voltage VBIAS. The "turned on" state of these bias circuits is symbolically illustrated by the "closed" state of the transistors PT-2 and PT-5, and the "open" state of the respective switches SW-2 and SW-5.

Thus, because the output voltages of the column lines corresponding to the off-pixels are fixed to the bias voltage VBIAS and are not changed, the output voltages of the column lines corresponding to the on-pixels adjacent to the off-pixels are not influenced by the output voltages of the column lines corresponding to the off-pixels.

If the output voltages of the column lines of the off-pixels are not fixed to a specific voltage, e.g., the bias voltage VBIAS provided by the bias circuits, the column lines of the off-pixels may be floated. In that case, the output voltages of the column lines of the off-pixels that are in the floated state may be changed due to coupling caused by the control signals RS, TG, SEL, etc. When the output voltages of the column lines of the off-pixels are changed, voltages of the floating diffusion nodes FD of the on-pixels may also change according to the sizes of the parasitic capacitors $CC_1$ and $CC_2$. Therefore, channel variation that causes a variation between output voltages of pixels may occur even under the same light-receiving conditions. The bias circuit-based stabilization of the voltages on the column lines of off-pixels, as partially illustrated in the exemplary embodiment of FIG. 6, may be used to substantially prevent such channel variations.

Figure 7:
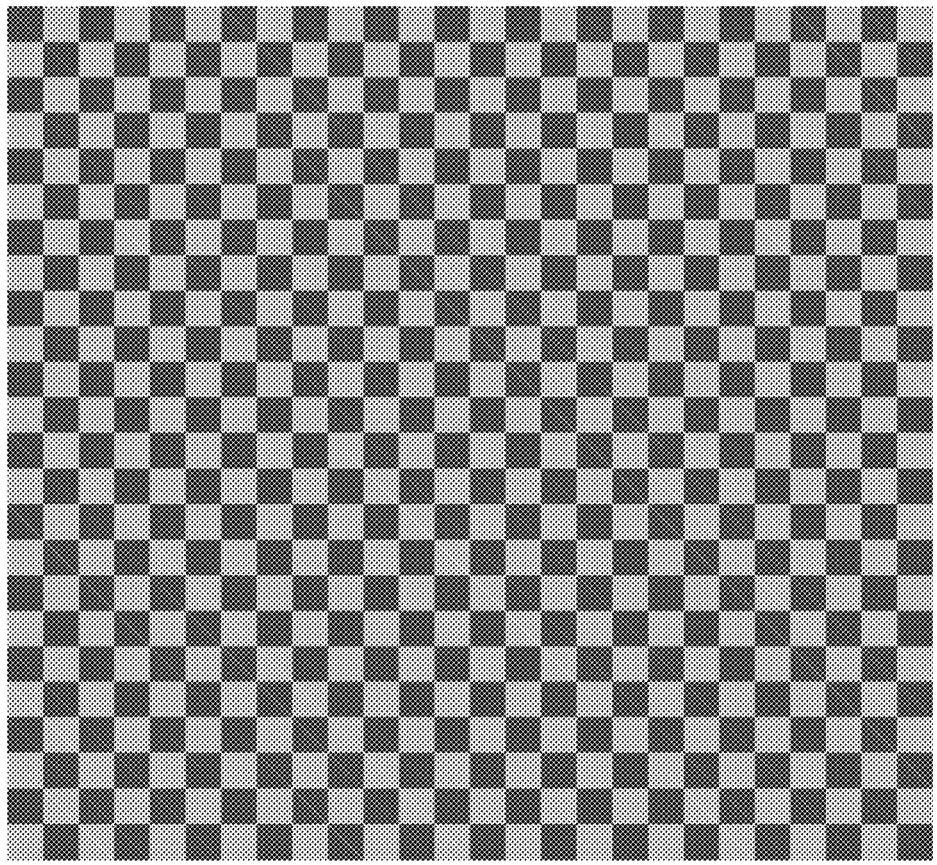
FIG. 7 is an exemplary diagram illustrating a state in which channel variation occurs when column lines of off-pixels are floated.
Figure 8:
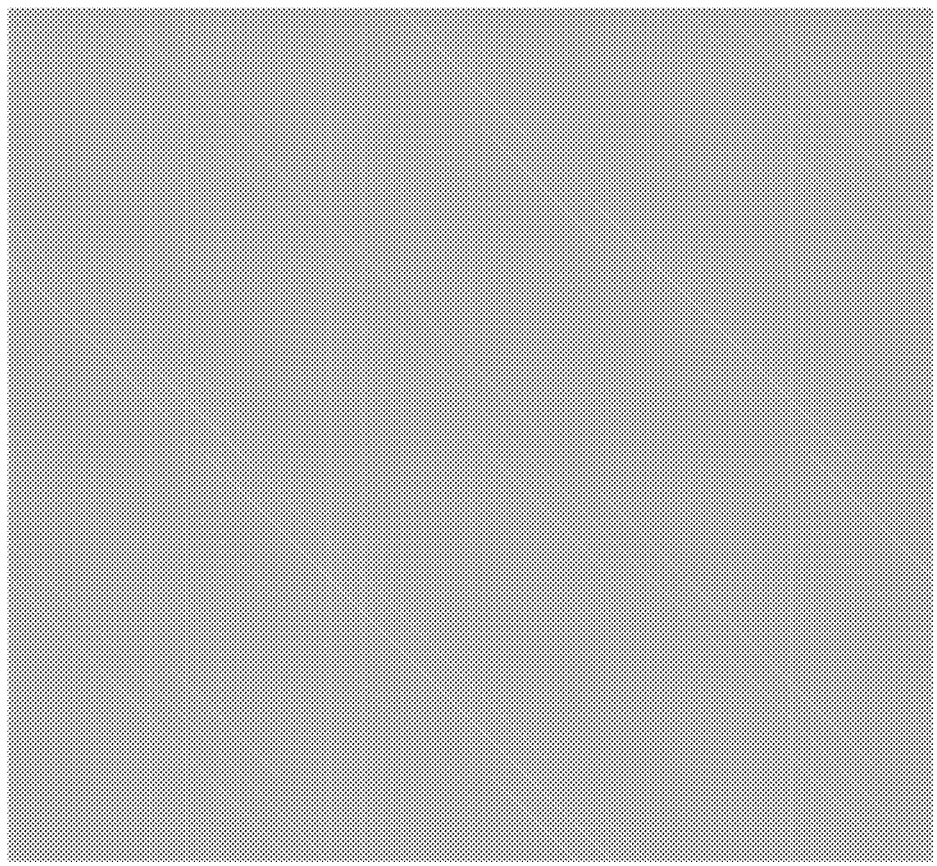
FIG. 8 is an exemplary diagram illustrating a state in which channel variation is substantially removed when voltages of column lines of off-pixels are fixed to a bias voltage according to one embodiment of the present disclosure.

FIG. 7 is an exemplary diagram illustrating a state in which channel variation occurs when column lines of off-pixels are floated. FIG. 8 is an exemplary diagram illustrating a state in which channel variation is substantially removed when voltages of column lines of off-pixels are fixed to a bias voltage, like the voltage VBIAS, according to one embodiment of the present disclosure.

Referring to FIG. 7, a variation between output voltages of pixels may cause the quality of a displayed image to be non-uniform even under the same light-receiving conditions. In FIG. 7, such variation is represented by the dark and light colored squares. For convenience of explanation, FIG. 7 illustrates a result of performing enhancement on an image that is actually output when channel variation occurs during a skip mode of operation.

In contrast, referring to FIG. 8, when voltages of column lines of off-pixels are fixed during the skip mode to a pre-determined bias voltage according to an embodiment of the present disclosure, channel variation may be substantially removed and thus the quality of the displayed image may be more uniform.

Figure 9:
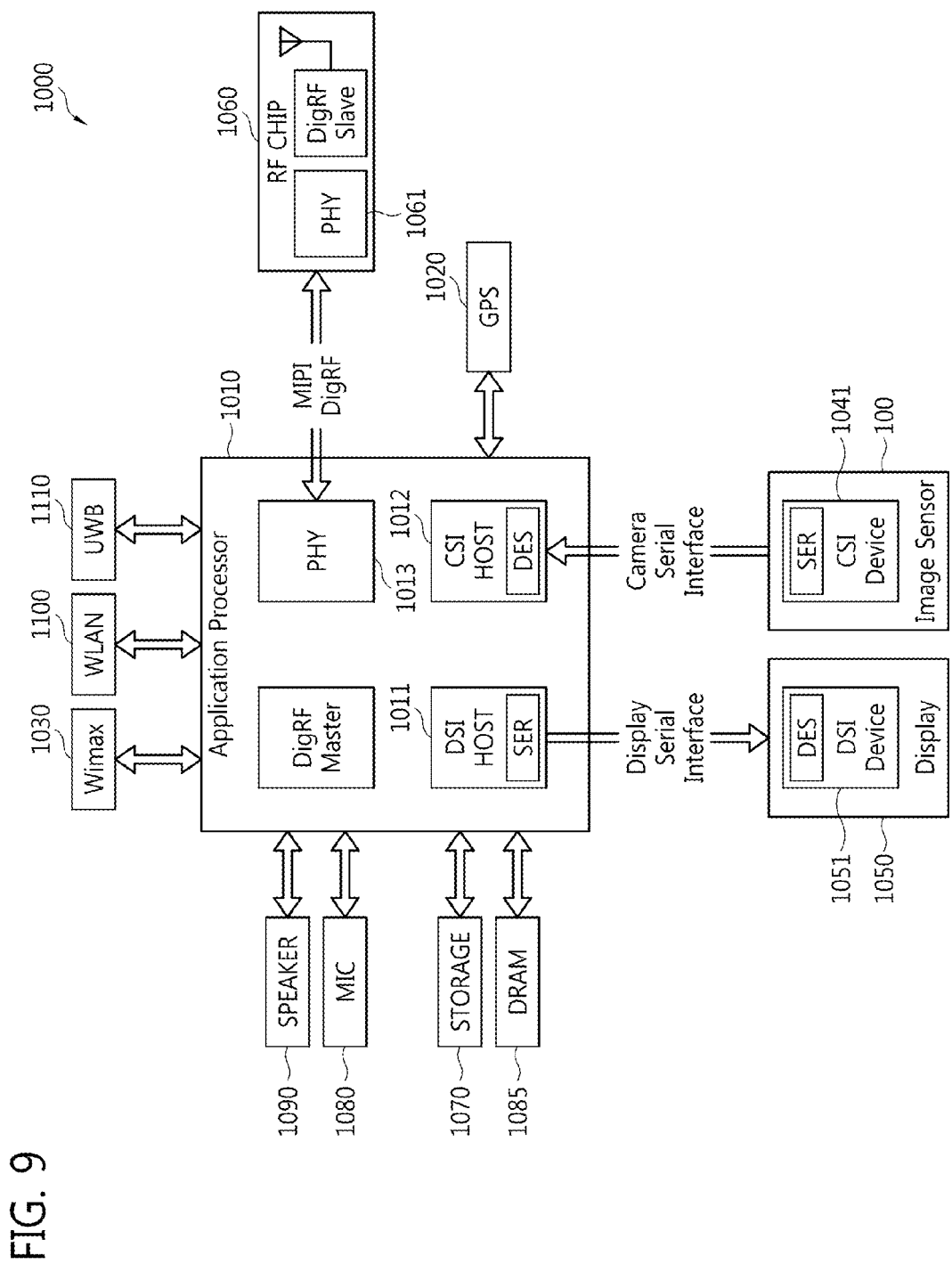
FIG. 9 is an exemplary block diagram of an electronic system including the image sensor of FIG. 1 according to some embodiments of the present disclosure.

FIG. 9 is an exemplary block diagram of an electronic system 1000 including the image sensor 100 of FIG. 1 according to some embodiments of the present disclosure. The electronic system 1000 may be implemented as a data processing apparatus, such as a mobile phone, a Personal Digital Assistant (PDA), a Portable Media Player (PMP), an Internet Protocol Television (IP TV), a computer or tablet, or a smart phone that can use or support the MIPI interface. The electronic system 1000 may include an application processor 1010, the image sensor 100, and a display 1050.

A Camera Serial Interface (CSI) host 1012 included in the application processor 1010 may perform serial communication through CSI with a CSI device 1041 included in the image sensor 100. For example, an optical de-serializer (DES) may be implemented in the CSI host 1012, and an optical serializer (SER) may be implemented in the CSI device 1041.

A Display Serial Interface (DSI) host 1011 included in the application processor 1010 may perform serial communication through DSI with a DSI device 1051 included in the display 1050. For example, an optical serializer (SER) may be implemented in the DSI host 1011, and an optical de-serializer (DES) may be implemented in the DSI device 1051.

The electronic system 1000 may also include a Radio Frequency (RF) chip 1060 which communicates with the application processor 1010. A physical layer (PHY) 1013 of the processor 1010 and a PHY 1061 of the RF chip 1060 may communicate data with each other according to a MIPI DigRF standard. The electronic system 1000 may further include at least one of the following: a Global Positioning System (GPS) receiver 1020, a storage device 1070, a microphone 1080, a Dynamic Random Access Memory (DRAM) 1085, and a speaker 1090. The electronic system 1000 may communicate with other systems or devices using Wimax (World Interoperability for Microwave Access) interface 1030, a WLAN (Wireless LAN, where "LAN" refers to a Local Area Network) interface 1100, or a Universal Serial Bus (USB) or UWB (Ultra Wideband) interface 1110, etc.

Figure 10:
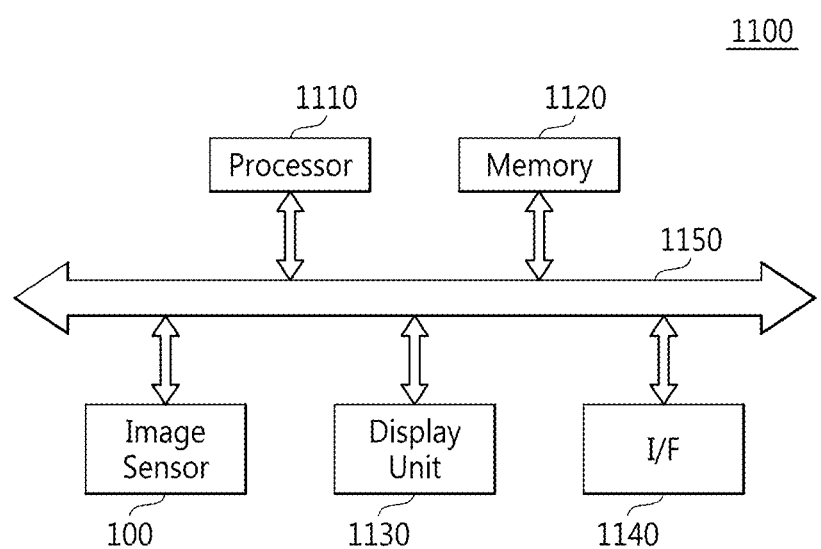
FIG. 10 is an exemplary block diagram of an image processing system including the image sensor of FIG. 1 according to some embodiments of the present disclosure.

FIG. 10 is an exemplary block diagram of an image processing system 1100 including the image sensor 100 of FIG. 1 according to some embodiments of the present disclosure. Referring to FIG. 10, the image processing system 1100 may include a processor 1110, a memory 1120, the image sensor 100, a display unit 1130, and an Input/Output Interface Unit (I/F) 1140.

The processor 1110 may control the operation of the image sensor 100. The processor 1110 may determine whether a camera (not shown) associated with the image sensor 100 is in a predetermined operating mode (for example, a live-view mode or a preview mode) and may control the image sensor 100 to operate in the skip mode when, for example, the camera associated with the image sensor 100 is in a live-view/preview mode and the skip mode is desired to decrease power consumption. In particular embodiments, the image sensor 100 may be a part of a camera module (not shown) or the camera may be a separate imaging apparatus operable under hardware/software control in conjunction with the image sensor 100.

The memory 1120 may store a program for controlling the operation of the image sensor 100 through a bus 1150 and may also store the image captured by the image sensor 100 and processed by the processor 1110. In particular embodiments, the program stored in the memory 1120 may be executed by the processor 1110 and, upon execution, the program may cause the processor 1110 to control various earlier-described operations of the image sensor 100 and other components in the system 1100. The processor 1110 may access the memory 1120 and execute the program. The memory 1120 may be a non-volatile memory.

The image sensor 100 may operate in the skip mode or the normal mode, and generate image information, under the control of the processor 1110.

The display unit 1130 may receive a processed image from the processor 1110 or the memory 1120 and display the image on a display (e.g., a Liquid Crystal Display (LCD) or an Active-Matrix Organic Light Emitting Diode (AMOLED) display). The I/F unit 1140 may facilitate the input and output of a two or three dimensional image to another system or device. The I/F unit 1140 may be implemented as a wireless I/F.

FIG. 11 is an example flowchart of a method of operating an image processing system including the image sensor 100 of FIG. 1 according to particular embodiments of the present disclosure. The method of FIG. 11 may be performed by the image processing system 1100 of FIG. 10.

Referring to FIGS. 10 and 11, when a camera of the image processing system 1100 is selected and activated by the image processing system 1100, the image sensor 100 included in a camera module (not shown) also may be activated (operation S110).

Then, it is determined whether a predetermined specific mode (e.g., a live-view mode or a preview mode) is selected as an operating mode of the camera module (operation S120).

The live-view mode or the preview mode is a mode in which a user may view an object before the user captures a photo or video of the object by using the camera of the image processing system 1100.

The live-view mode or the preview mode is, however, a major factor that increases power consumption in the camera module. Thus, according to an embodiment of the present disclosure, the image sensor 100 may be operated in the skip mode during the predetermined specific mode, such as the live-view mode or the preview mode (operation S130). The image sensor 100 may operate in a normal mode that is not the predetermined specific mode (operation S140).

When the image sensor 100 operates in the normal mode, all of the pixels in a selected row are on-pixels and thus image data is displayed based on output signals output from all of these pixels as described above with reference to FIG. 5 (operation S150).

In contrast, when the image sensor 100 operates in the skip mode, a portion of the pixels in a row may not be selected as discussed earlier with reference to FIG. 6. In that case, the image data is displayed based on output signals output from the pixels selected in the selected row (i.e., on-pixels) as described above with reference to FIG. 6. Voltages of column lines of pixels that are not selected in the selected row (i.e., off-pixels) may be fixed to the bias voltage VBIAS as discussed earlier.

Various operational aspects of the present disclosure can also be embodied as a computer-executable program code on a computer-readable medium. The computer-readable recording medium may be any data storage device that can store data as a program which can be thereafter read/executed by a computer system. Examples of the computer-readable recording medium include a Read-Only Memory (ROM), a Random Access Memory (RAM), CD-ROMs, magnetic tapes, floppy disks, and optical data storage devices.

The computer-readable recording medium can also be distributed over a network of computer systems so that the computer-readable code is stored and executed in a distributed fashion.

The foregoing describes an image sensor according to an embodiment of the present disclosure where channel variation may be decreased by reducing coupling noise between adjacent pixels in the skip mode of the image sensor. The noise may be decreased by preventing outputs of the off-pixels from floating. For example, the outputs of the column lines associated with the off-pixels may be fixed to a pre-determined bias voltage during the skip mode. Accordingly, the quality of an image may be improved.

While the present disclosure has been particularly shown and described with reference to exemplary embodiments thereof, it will be understood that various changes in form and details may be made therein without departing from the spirit and scope of the following claims.

What is claimed is:

1. An image sensor comprising:
   first to $m^{th}$ pixels, each of which is connected to a corresponding column line from among first to $m^{th}$ column lines and is configured to output a respective pixel signal, wherein 'm' denotes an integer that is equal to or greater than '2';

first to $m^{th}$ bias circuits, each of which is connected to a corresponding column line from among the first to $m^{th}$ column lines and is configured to fix a voltage of the corresponding column line to a bias voltage when a column line-specific pixel is not selected to output the respective pixel signal; and an analog-to-digital converter configured to convert the pixel signals into digital signals.

2. The image sensor of claim 1, wherein the bias voltage is equal to a supply voltage applied to the first to $m^{th}$ pixels.

3. The image sensor of claim 1, further comprising first to $m^{th}$ switches, wherein each switch is connected to a corresponding one of the first to $m^{th}$ column lines and is configured to be opened or closed in response to a respective one of first to $m^{th}$ column selection signals, wherein switches connected to the column lines of the non-selected pixels are opened.

4. The image sensor of claim 3, wherein each of the first to $m^{th}$ bias circuits comprises a transistor connected between the corresponding column line and a bias voltage source, and wherein the transistor is configured to be operated in response to a corresponding column selection signal from among the first to $m^{th}$ column selection signals.

5. The image sensor of claim 4, wherein the bias circuits connected to the column lines of the non-selected pixels are turned on, and wherein the bias circuits connected to the column lines of the selected pixels are turned off.

6. The image sensor of claim 3, wherein, in a skip mode, some of the first to $m^{th}$ switches are closed and the other switches are opened, and, in a normal mode, all of the first to $m^{th}$ switches are closed.

7. The image sensor of claim 6, which is operated in the skip mode when a camera associated with the image sensor is in a live-view mode or a preview mode.

8. The image sensor of claim 1, wherein the bias voltage is a ground voltage.

9. An image processing system comprising:

an image sensor including first to $m^{th}$ pixels, each of which is connected to a corresponding column line from among first to $m^{th}$ column lines and is configured to output a respective one of first to $m^{th}$ pixel signals, wherein 'm' denotes an integer that is equal to or greater than '2'; and a processor configured to control the image sensor, wherein the image sensor outputs some of the first to $m^{th}$ pixel signals in a skip mode, and outputs all of the first to $m^{th}$ pixel signals in a normal mode, and wherein, in the skip mode, a voltage of a column line associated with a pixel whose pixel signal is not output in the skip mode is fixed to a bias voltage.

10. The image processing system of claim 9, wherein the image sensor comprises:

first to $m^{th}$ bias circuits, each of which is connected to a corresponding column line from among the first to $m^{th}$ column lines and, in the skip mode, is configured to fix a voltage of the corresponding column line to a bias voltage when the column line-specific pixel is not selected to output the respective pixel signal; and an analog-to-digital converter configured to convert the first to $m^{th}$ pixel signals into digital signals.

11. The image processing system of claim 10, wherein each of the first to $m^{th}$ bias circuits comprises a transistor connected between the corresponding column line and a bias voltage source, and wherein the transistor is configured to be operated in response to a corresponding column selection signal from among first to $m^{th}$ column selection signals.

12. The image processing system of claim 11, wherein the bias voltage is equal to a supply voltage applied to the first to $m^{th}$ pixels, and the transistor of each of the first to $m^{th}$ bias circuits is a P-channel Metal Oxide Semiconductor (PMOS) transistor.

13. The image processing system of claim 11, wherein the bias voltage is a ground voltage, and the transistor of each of the first to $m^{th}$ bias circuits is an N-channel Metal Oxide Semiconductor (NMOS) transistor.

14. The image processing system of claim 10, wherein the image sensor further comprises first to $m^{th}$ switches, wherein each switch is connected to a corresponding one of the first to $m^{th}$ column lines and is configured to be opened or closed in response to a respective one of first to $m^{th}$ column selection signals.

15. The image processing system of claim 14, wherein, in the skip mode, some of the first to $m^{th}$ switches are closed and the other switches are opened, and, in the normal mode, all of the first to $m^{th}$ switches are closed.

16. An image sensor comprising:

a pixel connected to a column line and configured to generate a pixel signal in response to incident light, wherein the column line is configured to output the pixel signal in response to a column selection signal; and a bias circuit connected to the column line and configured to establish a pre-determined bias voltage on the column line when the column line is not selected by the column selection signal to output the pixel signal, and wherein a bias circuit is turned off when the column line is selected to output the pixel signal.

17. The image sensor of claim 16, wherein the bias voltage is one of the following:

a supply voltage applied to the pixel; and a ground potential.

18. The image sensor of claim 16, wherein the bias circuit includes:

a switch connected to the column line and is configured to be opened and closed in response to the column selection signal.

19. The image sensor of claim 16, wherein the bias circuit includes:

a transistor connected between the column line and a bias voltage source, and wherein the transistor is configured to be operated in response to the column selection signal.

20. The image sensor of claim 19, wherein the transistor is one of the following:

a P-channel Metal Oxide Semiconductor (PMOS) transistor; and an N-channel Metal Oxide Semiconductor (NMOS) transistor.

* * * * *